(12) United States Patent
Ikeda et al.

(10) Patent No.: US 11,434,652 B2
(45) Date of Patent: Sep. 6, 2022

(54) PARKING SYSTEM THAT CONTROLS CHECK-IN AND CHECK-OUT OF RENTAL VEHICLE

(71) Applicant: GIKEN LTD., Kochi (JP)

(72) Inventors: Toshio Ikeda, Kochi (JP); Mamoru Uesugi, Kochi (JP)

(73) Assignee: GIKEN LTD., Kochi (JP)

( * ) Notice: Subject to any disclaimer, the term of this patent is extended or adjusted under 35 U.S.C. 154(b) by 0 days.

(21) Appl. No.: 17/252,464

(22) PCT Filed: Jun. 14, 2019

(86) PCT No.: PCT/JP2019/023608
§ 371 (c)(1),
(2) Date: Dec. 15, 2020

(87) PCT Pub. No.: WO2019/240250
PCT Pub. Date: Dec. 19, 2019

(65) Prior Publication Data
US 2021/0189754 A1 Jun. 24, 2021

(30) Foreign Application Priority Data

Jun. 15, 2018 (JP) .............................. JP2018-114189

(51) Int. Cl.
*H02J 7/00* (2006.01)
*E04H 6/14* (2006.01)
(Continued)

(52) U.S. Cl.
CPC .............. *E04H 6/14* (2013.01); *B60L 53/305* (2019.02); *B60L 53/36* (2019.02); *B62M 6/90* (2013.01); *E04H 6/424* (2013.01); *B60L 2200/12* (2013.01)

(58) Field of Classification Search
CPC ...................................................... E04H 6/14
See application file for complete search history.

(56) References Cited

U.S. PATENT DOCUMENTS

| | | | |
|---|---|---|---|
| 2006/0018738 A1* | 1/2006 | Yen ........................... | E04H 6/14 414/234 |
| 2008/0014059 A1* | 1/2008 | Jones ........................ | E04H 6/14 414/227 |

(Continued)

FOREIGN PATENT DOCUMENTS

| | | |
|---|---|---|
| CN | 107230346 A | 10/2017 |
| CN | 107575062 A | 1/2018 |

(Continued)

OTHER PUBLICATIONS

"Rent a bicycle empty-handed at the station in the mechanical bicycle parking lot is available at Maebashi Station north entrance from September, in Gunma." (Mar. 7, 2016). Tokyo Yomiuri Shimbun morning edition, p. 33 (3 pages).

(Continued)

*Primary Examiner* — Yalkew Fantu
(74) *Attorney, Agent, or Firm* — Osha Bergman Watanabe & Burton LLP

(57) ABSTRACT

A parking system includes an inventory status storage storing the status of inventory of a bicycle, two-wheeled vehicle, or car, and a control system that controls the status of inventory of the bicycle, two-wheeled vehicle, or car and controls check-in and check-out of the bicycle, two-wheeled vehicle, or car based on data stored in the inventory status storage. The parking system further includes a cooperative control unit for communicating with an external rental operator's server, converting instruction data on check-in and check-out transmitted from the server to commands processable for the control system, and instructing to do check-in and check-out.

6 Claims, 15 Drawing Sheets

(51) Int. Cl.
*B60L 53/30* (2019.01)
*B60L 53/36* (2019.01)
*B62M 6/90* (2010.01)
*E04H 6/42* (2006.01)

(56) References Cited

U.S. PATENT DOCUMENTS

2009/0240575 A1* 9/2009 Bettez .................... H02S 10/20
  705/13
2019/0244284 A1* 8/2019 Miwa .................... G07F 15/005

FOREIGN PATENT DOCUMENTS

| CN | 207078235 U | | 3/2018 | |
|---|---|---|---|---|
| JP | 2004-030454 | * | 1/2004 | ............... B65G 1/04 |
| JP | 2004-030454 A | | 1/2004 | |
| JP | 2006-144487 A | | 6/2006 | |
| JP | 2006-172114 A | | 6/2006 | |
| JP | 2006-309568 A | | 11/2006 | |
| JP | 2014-164591 A | | 9/2014 | |
| JP | 5640241 | * | 12/2014 | |
| JP | 5640241 B2 | | 12/2014 | |
| JP | 2016-45696 A | | 4/2016 | |
| JP | 2017-84264 A | | 5/2017 | |
| JP | 2017-217930 A | | 12/2017 | |
| JP | 2017-223097 A | | 12/2017 | |
| JP | 2018-30498 A | | 3/2018 | |

OTHER PUBLICATIONS

International Search Report issued in corresponding International Application No. PCT/JP2019/023608 dated Sep. 17, 2019, with translation (3 pages).
Office Action issued in corresponding Japanese Patent Application No. 2018-114189 dated Oct. 20, 2020, with translation (8 pages).
Decision to Grant a Patent issued in corresponding Japanese Patent Application No. 2018-114189 dated Dec. 15, 2020 (5 pages).
Office Action issued in corresponding Chinese Patent Application No. 20190040283.3, dated Jul. 15, 2021 (8 pages).

* cited by examiner

| Pallet number | Stored vehicle ID | Pallet number | Stored vehicle ID |
|---|---|---|---|
| P001 | Vacant | P021 | ECO5722 |
| P002 | ECO7528 | P022 | ECO1467 |
| P003 | ECO3693 | P023 | Y5372 |
| P004 | Y6527 | P024 | ECO5782 |
| P005 | ECO7823 | P025 | X487 |
| P006 | Vacant | P026 | ECO3958 |
| ... | ... | ... | ... |

FIG.5

| Pallet number | Stored vehicle ID | Pallet number | Stored vehicle ID |
|---|---|---|---|
| P001 | Vacant | P021 | ECO5722 |
| P002 | ECO7528 | P022 | ECO1467 |
| P003 | ECO3693 | P023 | Operator Y |
| P004 | Operator Y | P024 | ECO5782 |
| P005 | ECO7823 | P025 | Operator X |
| P006 | Vacant | P026 | ECO3958 |
| ⋮ | ⋮ | ⋮ | ⋮ |

FIG.11

PARKING SYSTEM THAT CONTROLS CHECK-IN AND CHECK-OUT OF RENTAL VEHICLE

TECHNICAL FIELD

The present invention relates to a bicycle parking system or parking system (hereinafter referred to as a "parking system") for controlling check-in, check-out, and the like of a bicycle, two-wheeled vehicle, or car (hereinafter referred to as a "bicycle or the like") performed at a bicycle parking facility or parking facility.

BACKGROUND ART

Bicycle-sharing and car-sharing systems are popular in recent years in which people share bicycles or cars with others and use them when they are necessary and at the right moment, Those sharing systems are provided with a plurality of stations where bicycles or cars can be rented (cycle or car ports), and a user borrows a bicycle or car from the nearest station and returns it to a station near a destination (e.g. Japanese Patent No. 5640241 as to bicycles).

SUMMARY OF THE INVENTION

Problems to be Solved by the Invention

In order to take advantage of sharing systems in which bicycles or cars are used when they are necessary and at the right moment, it is to be desired that cycle or car ports exist around the streets and can accommodate enough number of bicycles or cars.

It is not easy, however, to secure a place for setting up a dedicated bicycle parking facility or parking facility for a sharing system, which may hinder widespread use of sharing systems.

In view of the foregoing background, it is therefore a purpose of the present disclosure to provide a bicycle parking system that makes part of an existing bicycle parking facility available as a bicycle parking facility for bicycle-sharing use, and a parking system that makes part of an existing parking facility available as a parking facility for car-sharing use.

Means for Solving the Problems

A parking system according to the disclosure has a control system that controls check-in and check-out of a bicycle or the like, and the parking system comprises a cooperative control unit for communicating with an external bicycle-or-the-like rental operator's server and sending instructions to check a bicycle or the like in and out to the control system. The cooperative control unit thus allows for checking in and out in cooperation with an external rental operator's server.

In the parking system according to the disclosure, the cooperative control unit can be added for each of a plurality of rental operators capable of cooperating with a parking facility for a bicycle or the like and each unit may instruct the control system to do check-in and check-out. This can increase rental operators capable of using the parking system.

The parking system according to the disclosure may be an automated bicycle parking facility for storing an unlocked bicycle, and the cooperative control unit may notify a rental operator's server of the completion of return even when a bicycle of the rental operator is checked in with the bicycle being unlocked.

Since bicycles are shared in each bicycle sharing system, a method of locking a bicycle using a lock called a smart lock is adopted by bicycle sharing systems and those systems are operated in a manner where a bicycle is returned with its smart lock being locked. "Smart locks" are locks that use smartphones or other electronic devices to do locking and unlocking. Though locked bicycles cannot be guided to a place for check-in in some automated bicycle parking facilities, accepting the completion of return even when bicycles are unlocked would allow bicycle sharing systems to cooperate with those automated bicycle parking facilities.

The parking system according to the disclosure may be an automated bicycle parking facility for storing an unlocked bicycle, and may comprise: a locking detector for detecting locking of a bicycle to be checked in; and a notifier for, when the locking detector detects locking of a bicycle, sending out a message instructing to unlock the bicycle, and when locking of the rental operator's bicycle is detected, the notifier may send out a message notifying that check-in may be made without locking. The configuration according to the disclosure can encourage a bicycle-sharing user, who usually locks a bicycle when checking in (returning), to check in without locking.

The parking system according to the disclosure may comprise an instruction input unit for receiving instructions for check-in and check-out from a user, where the cooperative control unit may transmit check-in and check-out requests to the rental operator's server when instructions for check-in and check-out are inputted through the instruction input unit, receive from the rental operator's server a vehicle identifier of a bicycle or the like to be checked in and out, and instruct the control system to do check-in and check-out with designating the vehicle identifier.

This configuration, in which the cooperative control unit does check-in and check-out under instructions from a rental operator's server, allows the rental operator's server to control the status of use of the bicycle or the like. The instruction input unit may be an operation unit provided in the bicycle parking facility or parking facility, or may be configured to wirelessly receive instructions inputted by a user through a smartphone or any other terminal.

The parking system according to the disclosure may comprise an instruction input unit for receiving instructions for check-in and check-out from a user, where, after a bicycle or the like is checked in and out according to instructions for check-in and check-out inputted through the instruction input unit, the cooperative control unit may transmit a vehicle identifier of the bicycle or the like checked in and out and notification of the completion of check-in and check-out to the rental operator's server.

This configuration, in which a vehicle identifier of a bicycle or the like is transmitted to the rental operator's server after check-in and check-out made at the parking system in response to a user's operation, reduces communications with the rental operator's server and allows check-in and check-out to be made through a simple procedure.

The parking system according to the disclosure may comprise a charger for charging a battery of a checked-in bicycle or the like and transmit data indicating the charging rate of the bicycle or the like to the rental operator's server.

This allows the rental operator's server to control the charging status of the bicycle or the like.

Advantages of the Invention

The present disclosure allows the parking system to cooperate with a rental operator's server through the cooperative control unit and store a bicycle or the like of the rental operator.

BRIEF DESCRIPTION OF THE DRAWINGS

FIG. 5 shows an example of data stored in an inventory status storage;
FIG. 11 shows an example of data stored in an inventory status storage of a third embodiment;
FIG. 14 illustrates in detail a process to be performed when locking is detected at check-in.

DETAILED DESCRIPTION OF THE PREFERRED EMBODIMENT

Now, a parking system of an embodiment of the invention will be described with reference to the drawings. While the embodiment will be illustrated through a bicycle parking system for controlling an automated bicycle parking facility for parking bicycles, the parking system of the invention can be applied not only to automated bicycle parking facilities but also to, for example, gate-type and separate-lock-type bicycle parking facilities. The parking system of the invention can be applied not only to parking facilities for bicycles but also to parking facilities for motorcycles or other two-wheeled vehicles and cars.

First Embodiment

Figure 1:
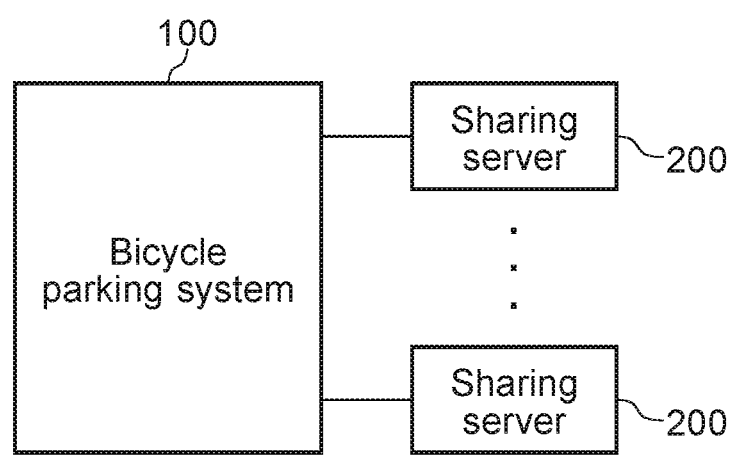
FIG. 1 shows a bicycle parking system and sharing servers of an embodiment.

FIG. 1 shows a bicycle parking system 100 of the embodiment and servers 200 of bicycle-sharing operators (sharing operators) (hereinafter referred to as the "sharing servers"). The bicycle parking system 100 is connected with a plurality of sharing servers 200 in FIG. 1. The mechanical configuration of the bicycle parking system 100 will be described prior to a description of functions the bicycle parking system 100 has.

Overall Configuration of the Parking System

Figure 2:
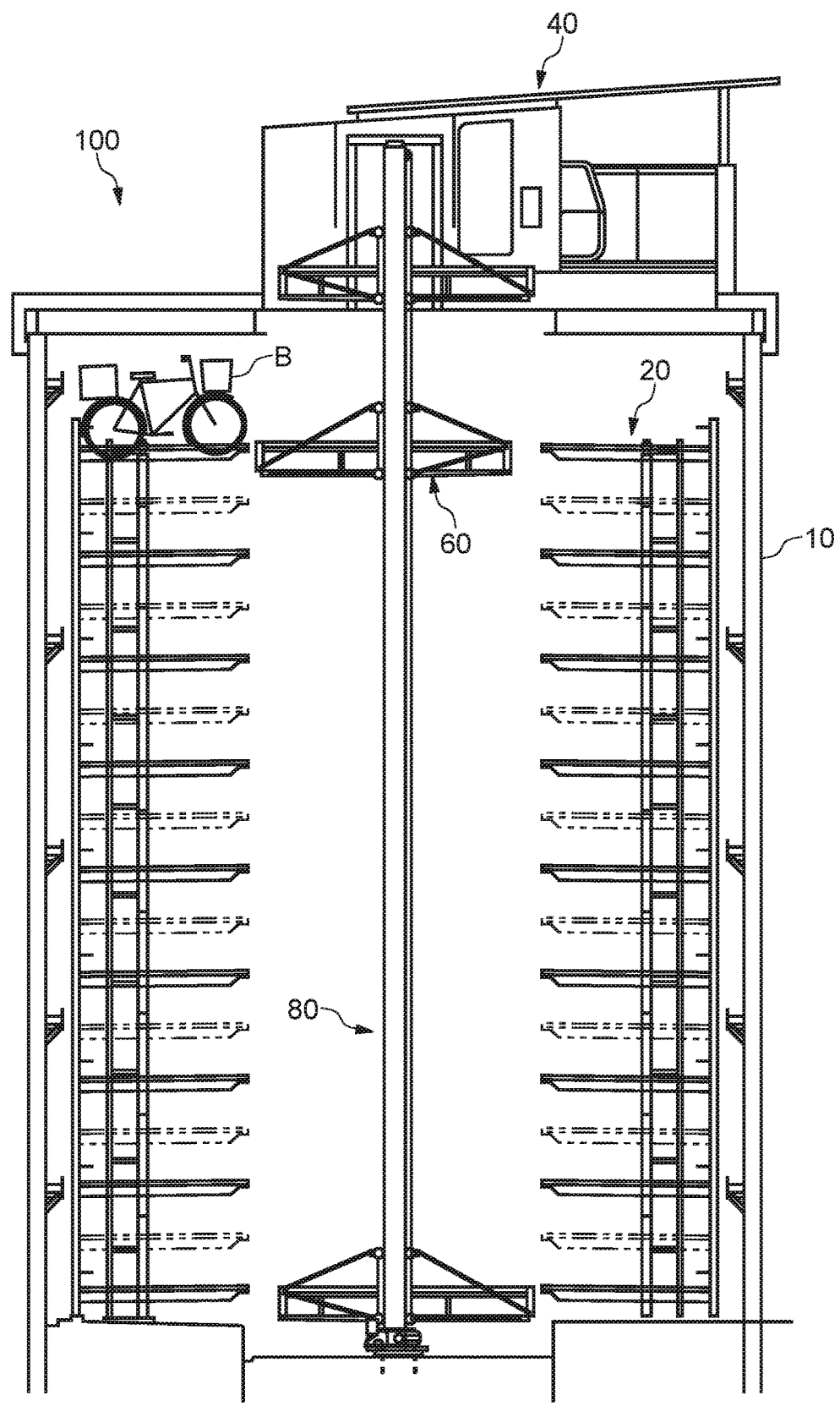
FIG. 2 is a side view showing a schematic configuration of the bicycle parking system of the embodiment.

FIG. 2 is a side view showing a schematic configuration of the bicycle parking system 100 according to the embodiment of the invention. The bicycle parking system 100 of the embodiment is a system for accommodating bicycles B. In order to accommodate a large number of bicycles B, the bicycle parking system 100 comprises: a buried-underground cylindrical frame 10; a storage 20 installed in the frame 10; a gate 40 for taking the bicycles B in and out of the storage 20; and a carrier 60 for carrying the bicycles B between the gate 40 and the storage 20.

The gate 40 is installed aboveground, and is almost centrally located on top of the frame 10. Users leave and pick up the bicycles B at this gate 40. The storage 20 is provided with a plurality of pallets for storing the bicycles B. The storage 20 has a plurality of layers each comprising a plurality of pallets, and the plurality of bicycles B are stored on top of one another in the direction of height (depth) in the frame 10. In order to prevent a stored bicycle from hitting a pallet located right above, vertically neighboring pallets are positioned out of alignment. This arrangement realizes efficient space utilization and the storage of a larger number of bicycles.

The carrier 60 carries a bicycle B from the gate 40 to one of the pallets in the storage 20 at check-in, and carries a bicycle B from a pallet to the gate 40 at check-out. A lift 80 lowers the carrier 60 that has received a bicycle B at the gate 40 aboveground to the height (depth) of the relevant pallet at check-in, and raises the carrier 60 that has received a bicycle B from a pallet to the gate 40 at check-out.

Figure 3:
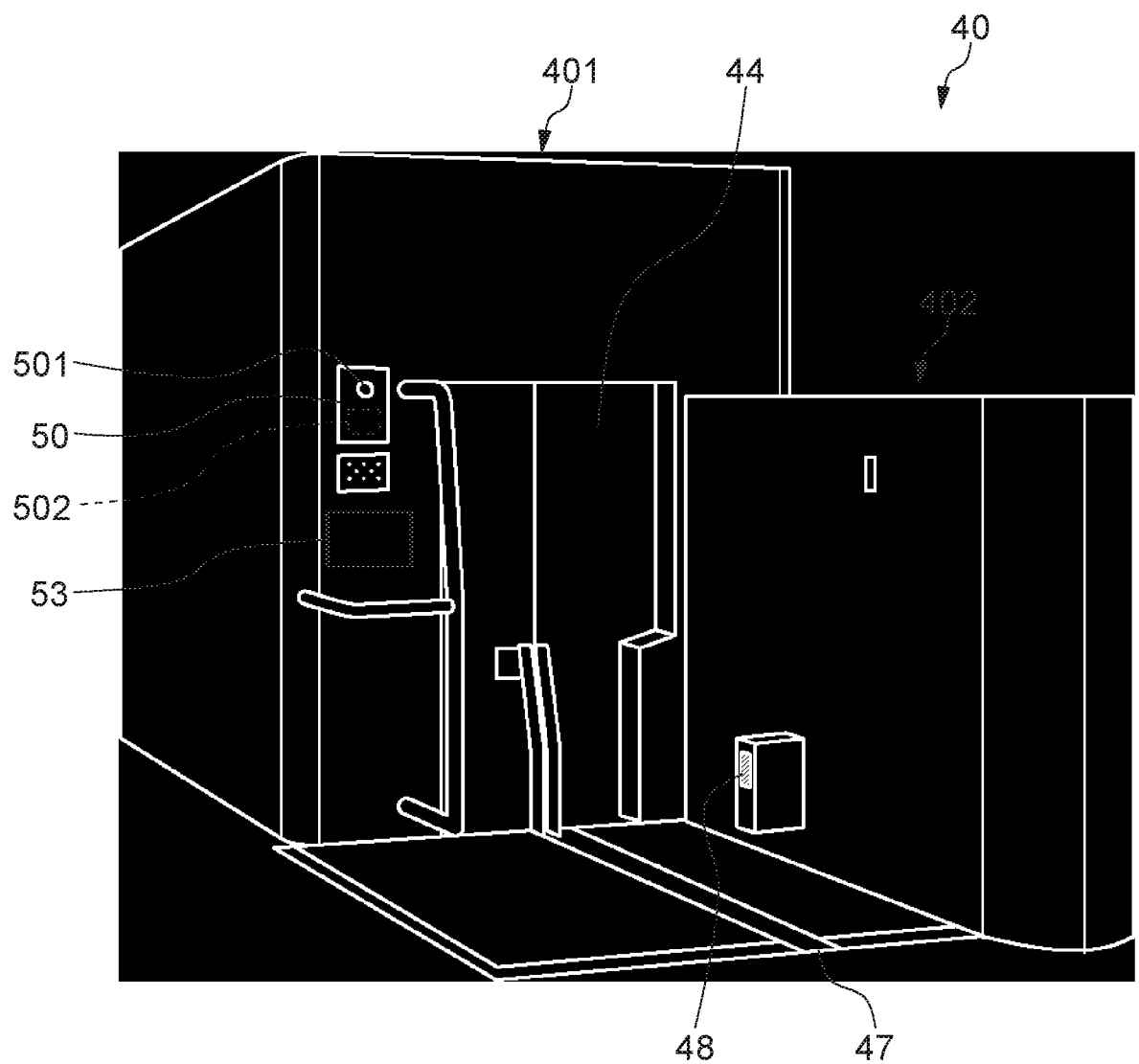
FIG. 3 is a perspective view of a gate of the embodiment.

FIG. 3 is a perspective view of the gate 40. The gate 40 comprises: a storage top booth 401; and a leaving and picking up unit 402 adjacent to the storage top booth 401. The leaving and picking up unit 402 leads to the storage top booth 401 through a door 44 provided on the storage top booth 401.

A guide rail 47, which is a pathway along which the bicycles B move, extends on the ground level of the leaving and picking up unit 402 toward the door 44. The guide rail 47 has a width a little wider than the width of the bicycles B's tires. A locking detector is provided on the guide rail 47 at a position corresponding to rear tires. An IC tag reader 48 is provided as a reading device at a position corresponding to the bicycles B's front forks.

An operation panel 50 is provided as an operation device on the wall of the storage top booth 401, where the operation panel 50 comprises a start switch 501 and an IC card reader writer 502 as a reading device. A touch panel 53 is provided below the operation panel 50 for a user to input through a touch operation. The touch panel 53 is a user interface to be used for checking in and out the sharing operators' bicycles B.

An IC tag is mounted as a storage medium on the right side of the front fork of a bicycle B. Bicycles B enter head-in the storage top booth 401 in the embodiment, which means that their IC tags are located near the IC tag reader 48.

The IC tag reader 48 reads in a non-contact manner an IC tag mounted on the front fork of a bicycle B that has come into the guide rail 47.

Figure 4:
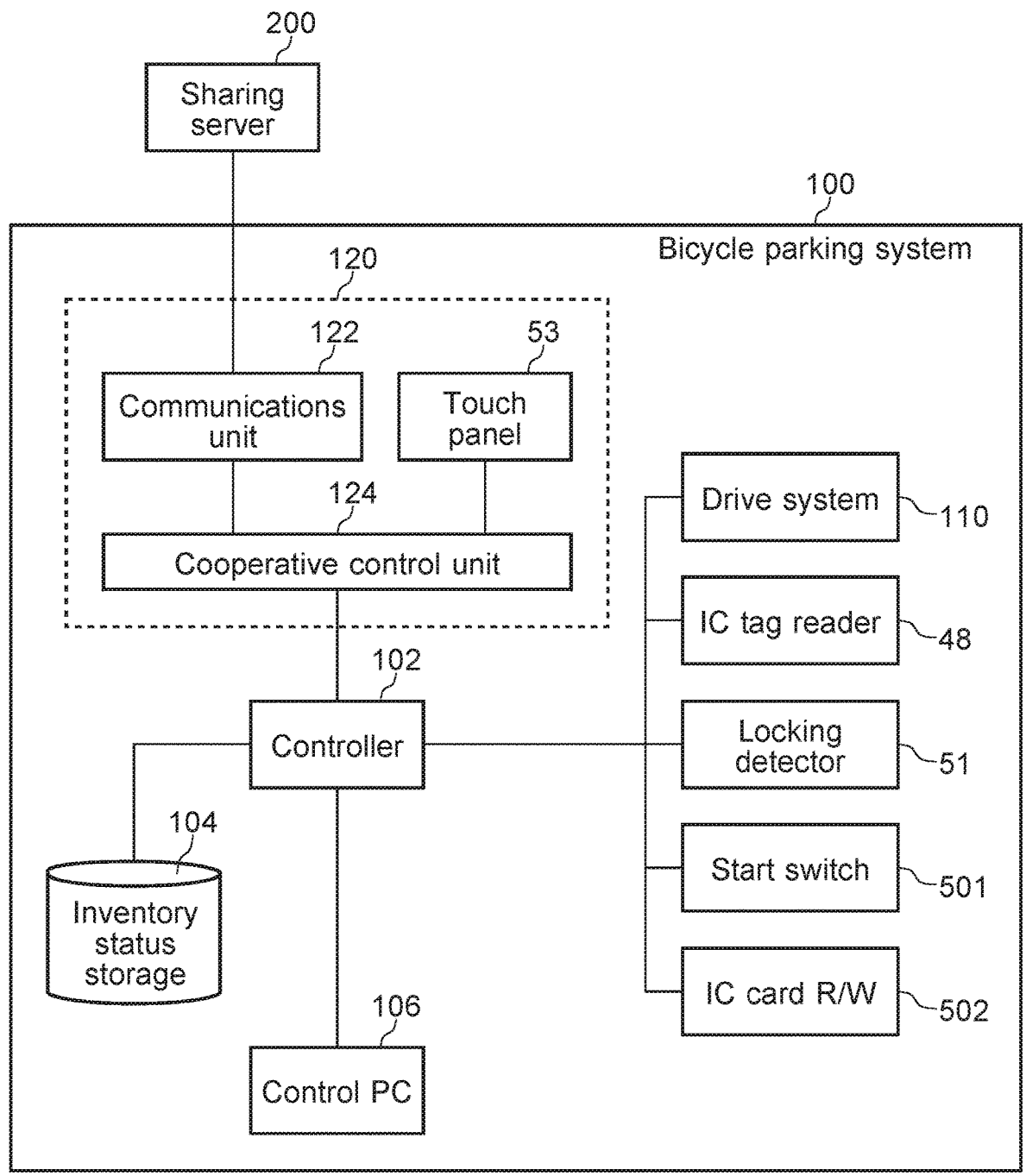
FIG. 4 shows functional blocks of the bicycle parking system of a first embodiment.

FIG. 4 shows functional blocks of the bicycle parking system 100. The bicycle parking system 100 has an automated bicycle parking facility controller (hereinafter referred to as the "controller") 102 for controlling check-in, check-out of a bicycle, and the like. The controller 102 corresponds to the "control system" of the invention.

The controller 102 is connected with a drive system 110. The drive system 110 comprises various devices, for example the door 44 and the carrier 60, that operate at check-in and check-out of bicycles B. The controller 102 controls the drive system 110 of the bicycle parking system 100.

The controller 102 is also connected with the IC tag reader 48, locking detector 51, start switch 501, and IC card reader writer 502. Based on information from these sensors, the controller 102 controls the drive system 110 for bicycles to be checked in and out safely. The controller 102 is further connected with an inventory status storage 104. The inventory status storage 104 may be installed outside the controller 102, or memory inside the controller 102 or any other storage may be used as the inventory status storage 104.

FIG. 5 shows an example of data stored in the inventory status storage 104. Vehicle IDs of bicycles stored in the pallets are stored in the inventory status storage 104 with pallet numbers corresponding to them. When no bicycle is stored in a pallet, no vehicle ID is stored for the pallet number. FIG. 5 uses an indication saying "(Vacant)" for convenience sake.

Vehicle IDs starting with "ECO" are IDs that identify bicycles of users who are under contract with the bicycle parking system 100. Vehicle IDs starting with "X" are IDs given by a sharing operator X in order to identify bicycles within the operator. Vehicle IDs starting with "Y" are IDs given by a sharing operator Y in order to identify bicycles within the operator. The inventory status storage 104 thus uses IDs used by operators concerned to control the inventory status for the sharing operator's bicycles.

Returning to FIG. 4, the bicycle parking system 100 will be described. The controller 102 is connected with a control PC 106. The control PC 106 is a PC used by an administrator of the bicycle parking system 100. The control PC 106 may be provided with, for example, an IC card reader writer and an IC tag reader writer. This allows for checking the registration and contents of users' IC tags and IC cards.

A communications unit 122, an operation unit such as the touch panel 53, and a cooperative control unit 124 for controlling these are provided as components for making the bicycle parking system 100 and the sharing operators cooperate with each other. These comprise a unit 120 that are added to the bicycle parking system 100 in order to make the sharing server 200 and the bicycle parking system 100 cooperate with each other. The cooperative control unit 124 is realized by executing an operator application added to the bicycle parking system 100. The bicycle parking system 100 has a module for sending instructions to the controller 102 ready so as to be able to facilitate the addition of the operator application. By invoking this module, the operator application can realize the cooperative control unit 124 that can send instructions to the controller 102.

The communications unit 122 has a function to communicate with the sharing server 200. A communications line between the bicycle parking system 100 and the sharing server 200 may be a mobile line or an optical line. The touch panel 53 receives inputs of information including a user ID and password. The cooperative control unit 124 passes on to the controller 102 information obtained from communications with the sharing server 200 and from an exchange with a user. A function of the cooperative control unit 124 is to convert instruction data on check-in and check-out transmitted from the sharing server 200 to an instruction for the controller 102 and instruct to do check-in and check-out.

While FIG. 4 illustrates the example in which the touch panel 53 is used as an operation unit for an interface to a user, what to use as an interface to a user may be different from one sharing operator to another. Some sharing operators may use, for example, a bar code, a QR code (registered trademark), a mobile terminal including a smartphone, or biometric authentication including face authentication. When such sharing operators are to be cooperated with, a bar code reader, a QR code (registered trademark) reader, a communications device for a mobile terminal, or hardware for biometric authentication is attached so that information required for processing can be acquired.

Since the above-described cooperative control unit 124 is to accommodate variations in different specifications for each sharing operator, a different cooperative control unit 124 for each sharing operator is required. On the other hand, the touch panel 53, the communications unit 122, and the like may be shared among different sharing operators if they can be shared. The IC tag reader 48 and the IC card reader writer 502 may also be shared if they are required for cooperation with sharing operators.

Figure 6:
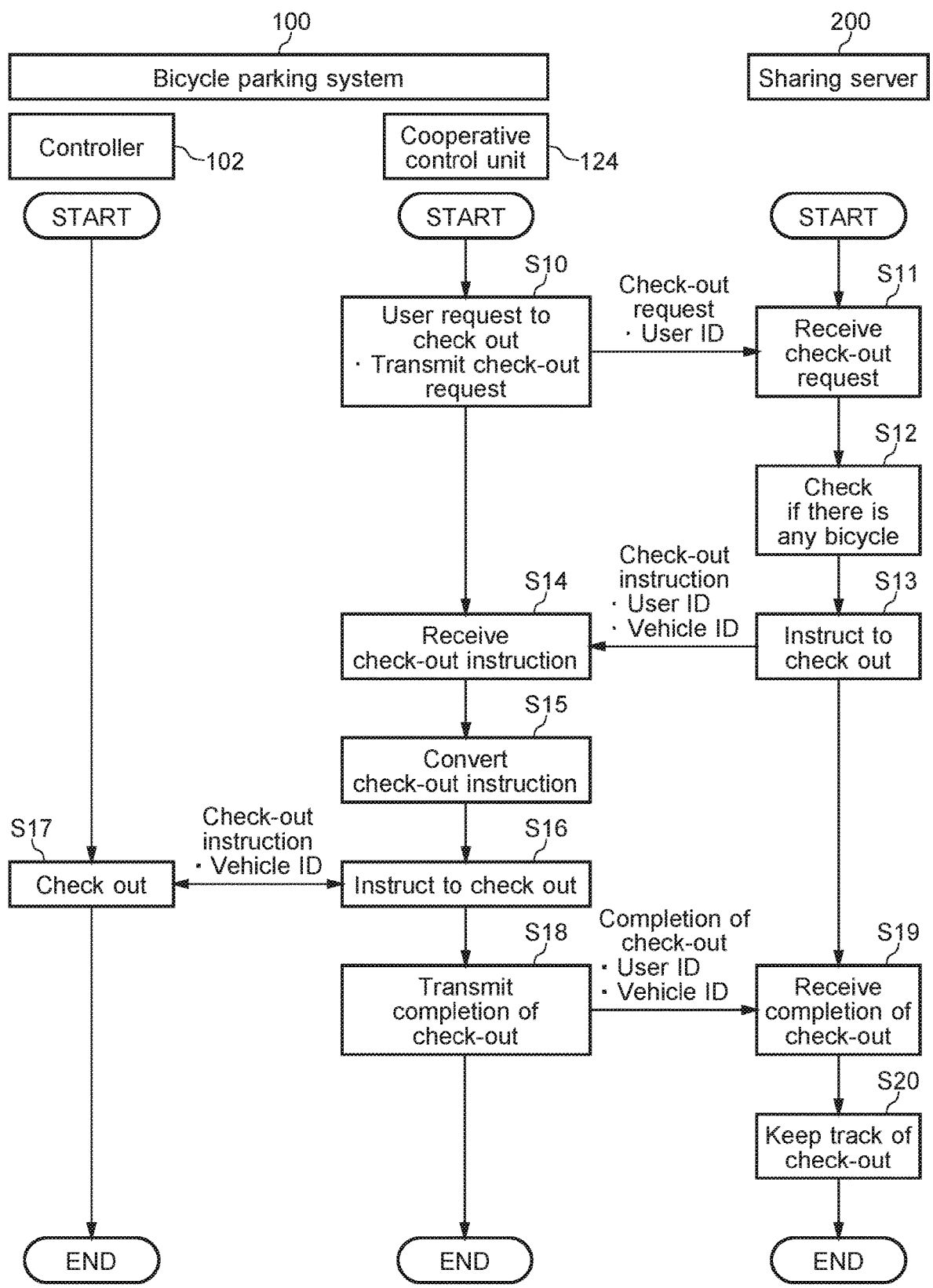
FIG. 6 shows an operation example of checking out a sharing operator's bicycle by means of the bicycle parking system of the first embodiment.

FIG. 6 shows an operation example of checking out a sharing operator's bicycle by means of the bicycle parking system 100 of the first embodiment. When a user operates through the touch panel 53 to request to check out a bicycle, the cooperative control unit 124 transmits a check-out request to the sharing server 200 (S10). The operation required for a check-out request is to be specified by the sharing operator and, temporarily and for example, suppose that the operation is the user's inputting through the touch panel 53 of a user ID given by the contracted sharing operator. The check-out request transmitted from the cooperative control unit 124 to the sharing server 200 includes the user ID.

Upon receiving the check-out request (S11), the sharing server 200 checks whether any bicycle is left in the bicycle parking facility from which the request came or not based on data managed in the sharing server 200 (S12). If the result is that a bicycle is left in the bicycle parking facility, the sharing server 200 transmits an instruction to check out the bicycle to the bicycle parking system 100 (S13). This check-out instruction shall include the user ID and the vehicle ID of the bicycle to be checked out. When there are a plurality of bicycles left in the bicycle parking facility, the sharing server 200 chooses which bicycle to check out.

Upon receiving the check-out instruction transmitted from the sharing server 200 (S14), the cooperative control unit 124 of the bicycle parking system 100 converts the check-out instruction to a check-out instruction for the controller 102 (S15), and instructs the controller 102 to do check-out (S16). This check-out instruction includes the vehicle ID. Upon receiving the check-out instruction, the controller 102 checks out the bicycle with the vehicle ID included in the check-out instruction (S17). The controller 102 identifies a pallet number by the vehicle ID based on data stored in the inventory status storage 104 (see FIG. 5), and controls the drive system 110 to check out the bicycle from the pallet with the pallet number.

When the bicycle is successfully checked out, the cooperative control unit 124 transmits notification of the completion of check-out to the sharing server 200 (S18). The notification of the completion of check-out includes the user ID and the vehicle ID. Upon receiving the notification of the completion of check-out (S19), the sharing server 200 keeps track of the checked-out bicycle (S20). In other words, the sharing server 200 keeps track of which user is using which bicycle.

While the operation of the bicycle parking system 100 has been shown along with the operation on the side of the sharing server 200, the operation on the side of the sharing server 200 can be designed by the sharing operator and is different from one sharing operator to another. For example, the sharing server 200 may request the cooperative control unit 124 for a password for the user ID and authenticate the user.

Figure 7:
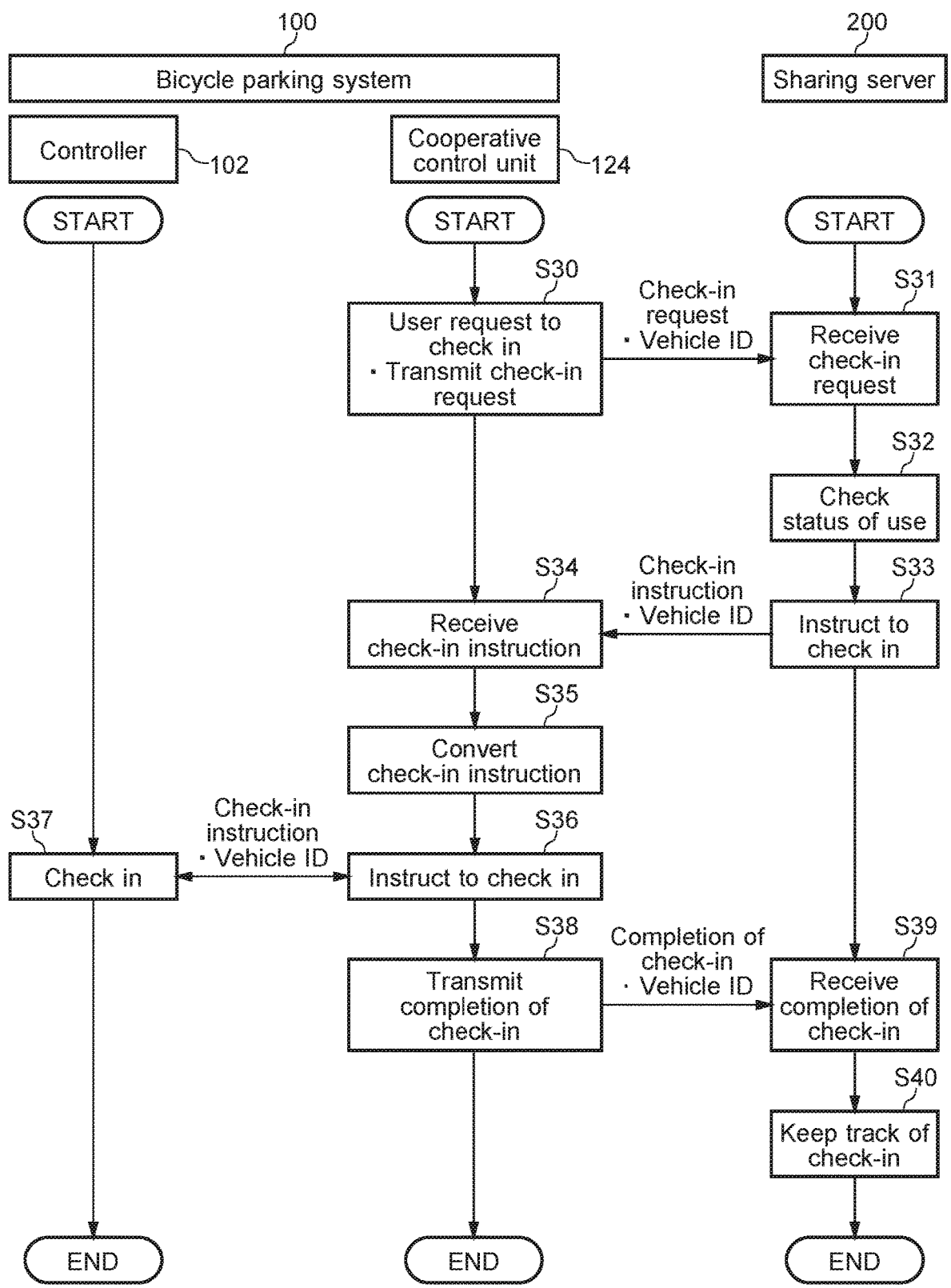
FIG. 7 shows an operation example of checking in a sharing operator's bicycle by means of the bicycle parking system of the first embodiment.

FIG. 7 shows an operation example of checking in a sharing operator's bicycle by means of the bicycle parking system 100 of the first embodiment. When a user operates through the touch panel 53 to request to check in a bicycle, the cooperative control unit 124 transmits a check-in request to the sharing server 200 (S30). The operation required for a check-in request is to be specified by the sharing operator and, temporarily and for example, suppose that the operation is the user's inputting through the touch panel 53 of a vehicle ID of the bicycle the user is renting. The check-in request transmitted from the cooperative control unit 124 to the sharing server 200 includes the vehicle ID.

Upon receiving the check-in request (S31), the sharing server 200 checks the status of use of the bicycle based on data managed in the sharing server 200 (S32). The status of use is, for example, which user is currently using the bicycle related to the vehicle ID included in the check-in request. If it is consequently confirmed that the bicycle related to the vehicle ID is currently in use, the sharing server 200 transmits a check-in instruction to the bicycle parking system 100 (S33). This check-in instruction shad include the vehicle ID of the bicycle to be checked in.

Upon receiving the check-in instruction transmitted from the sharing server 200 (S34), the cooperative control unit 124 of the bicycle parking system 100 converts the check-in instruction to a check-in instruction for the controller 102 (S35), and instructs the controller 102 to do check-in (S36). This check-in instruction includes the vehicle ID. Upon receiving the check-in instruction, the controller 102 stores the bicycle in a vacant pallet and stores information on which pallet the bicycle has been stored in in the inventory status storage 104 (see FIG. 5) (S37). The bicycle parking system 100 determines that the check-in is complete even if the checked-in bicycle is unlocked.

When the bicycle is successfully checked in, the cooperative control unit 124 transmits notification of the completion of check-in to the sharing server 200 (S38). The notification of the completion of check-in includes the vehicle ID. Upon receiving the notification of the completion of check-in (S39), the sharing server 200 keeps track of the checked-in bicycle (S40). In other words, the sharing server 200 keeps track of the status indicating that the bicycle has been returned.

The bicycle parking system 100 of the first embodiment allows for the addition of the cooperative control unit 124 to the bicycle parking system 100, and the added cooperative control unit 124 converts a check-in or check-out instruction transmitted from the sharing server 200 and passes it to the controller 102. This allows the sharing server 200 to cooperate with the bicycle parking system 100 even when the bicycle parking system 100 has a gate device or the like.

Since the cooperative control unit 124 converts check-in and check-out instructions transmitted from the sharing server 200 to commands processable for the controller 102, cooperation with a plurality of different sharing servers 200 can be realized without changing the specifications of the controller 102.

Second Embodiment

Figure 8:
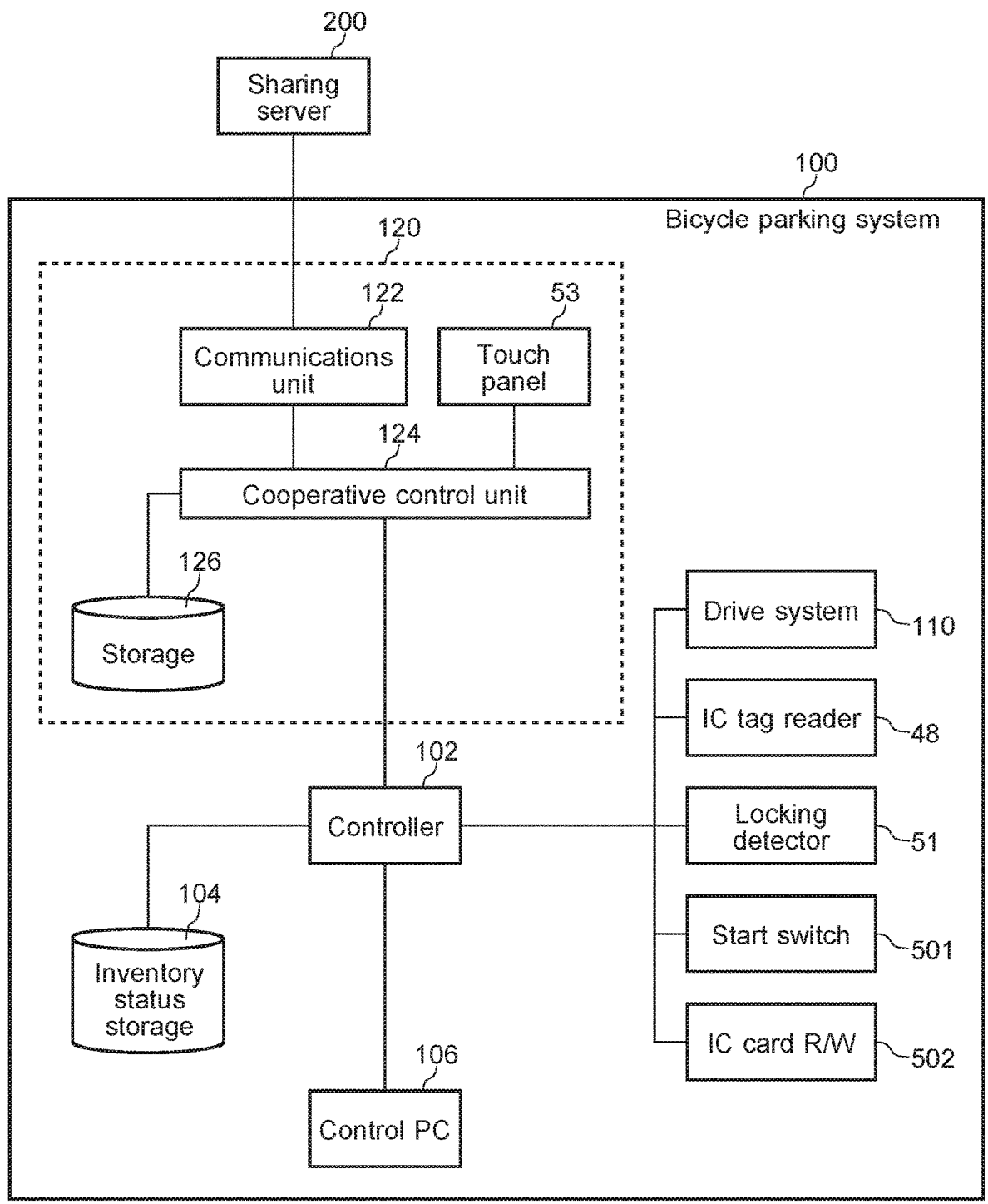
FIG. 8 shows functional blocks of the bicycle parking system of a second embodiment.

FIG. 8 shows functional blocks of the bicycle parking system 100 of a second embodiment. The configuration of the bicycle parking system 100 of the second embodiment is basically the same as the bicycle parking system 100 of the first embodiment, but the cooperative control unit 124 is connected with a storage 126. The storage 126 may be installed outside the cooperative control unit 124, or memory inside the cooperative control unit 124 or any other storage may be used as the storage 126. The storage 126 stores at least data for authenticating users of the sharing operators, and vehicle IDs of the sharing operators' bicycles stored in the bicycle parking facility. As to the data for authenticating users, for example, the sharing servers 200 may deliver the data on a regular basis, or the cooperative control unit 124 may query the sharing servers 200 as to the data in the bicycle parking facility's slow period. In the second embodiment, check-in or check-out is done by use of vehicle data locally controlled by the cooperative control unit 124, and the result is transmitted to the sharing servers 200.

Figure 9:
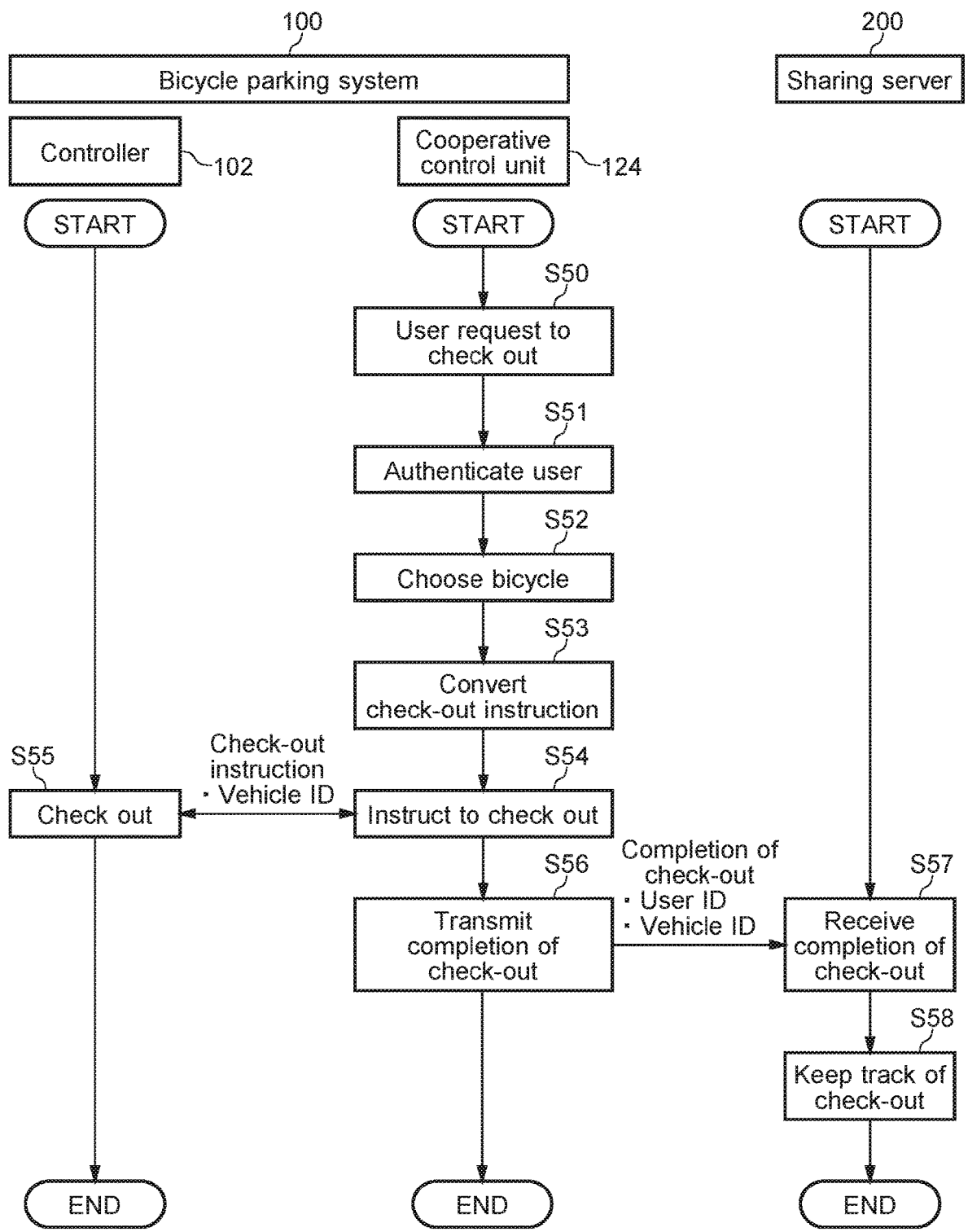
FIG. 9 shows an operation example of checking out a sharing operator's bicycle by means of the bicycle parking system of the second embodiment.

FIG. 9 shows an operation example of checking out a sharing operator's bicycle by means of the bicycle parking system 100 of the second embodiment. A user operates through the touch panel 53 to request to check out a bicycle (S50). The cooperative control unit 124 authenticates the user based on information inputted by the user (S51). For example, when a user ID and a password are inputted, the cooperative control unit 124 checks if there is a combination of those in the storage 126 or not.

The cooperative control unit 124 chooses a bicycle of the sharing operator stored in the bicycle parking system 100 (S52), converts the check-out instruction as to the chosen bicycle (S53), and instructs the controller 102 to do check-out (S54). This check-out instruction includes the vehicle ID. Upon receiving the check-out instruction, the controller 102 checks out the bicycle with the vehicle ID included in the check-out instruction (S55). The controller 102 identifies a pallet number by the vehicle ID based on data stored in the inventory status storage 104 (see FIG. 5), and controls the drive system 110 to check out the bicycle from the pallet with the pallet number.

When the bicycle is successfully checked out, the cooperative control unit 124 transmits notification of the completion of check-out to the sharing server 200 (S56). The notification of the completion of check-out includes the user ID and the vehicle ID. Upon receiving the notification of the completion of check-out (S57), the sharing server 200 keeps track of the checked-out bicycle (S58). In other words, the sharing server 200 keeps track of which user is using which bicycle.

Figure 10:
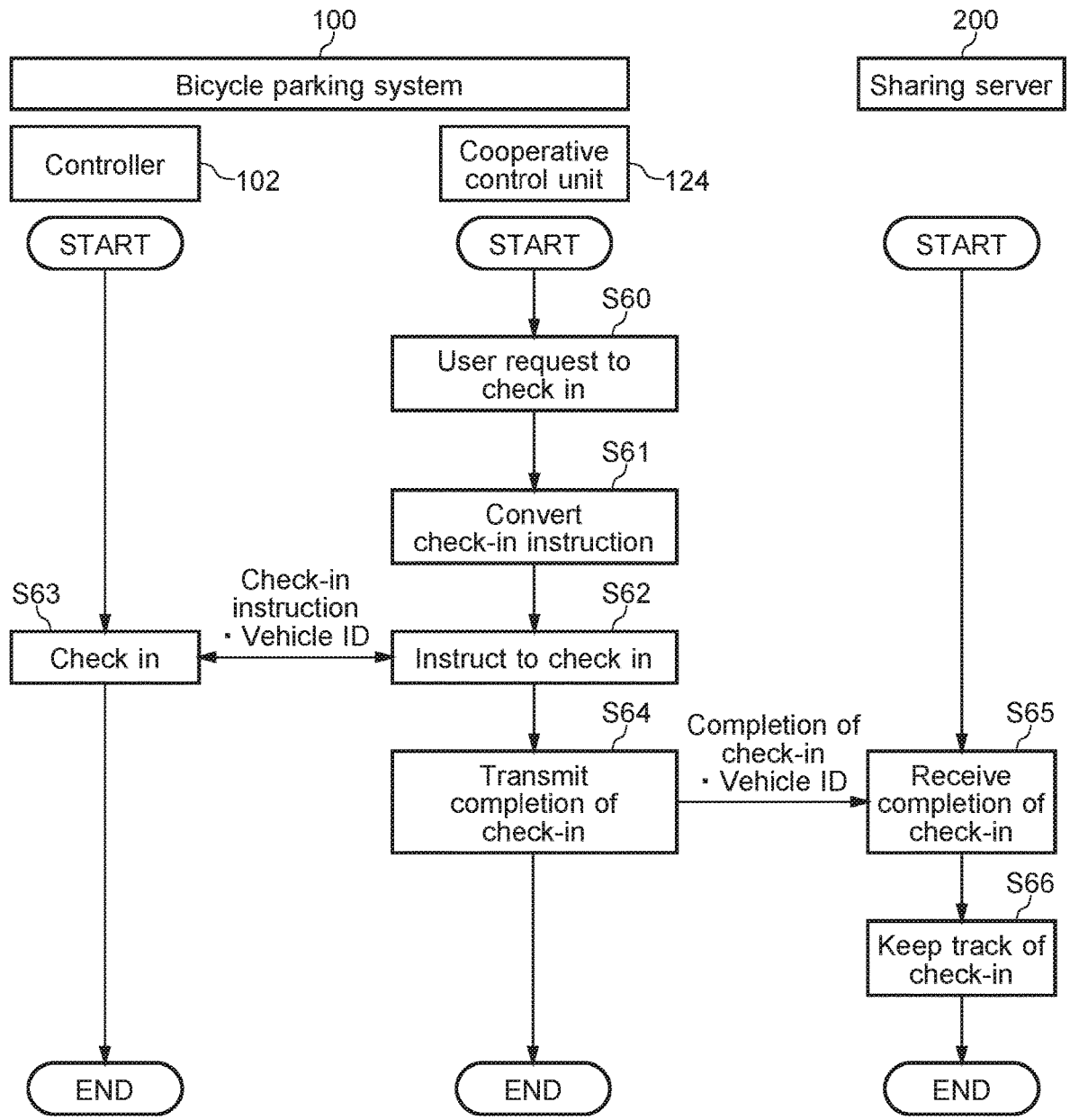
FIG. 10 shows an operation example of checking in a sharing operator's bicycle by means of the bicycle parking system of the second embodiment.

FIG. 10 shows an operation example of checking in a sharing operator's bicycle by means of the bicycle parking system 100 of the second embodiment. When a user operates through the touch panel 53 to request to check in a bicycle (S60), the cooperative control unit 124 converts the check-in instruction to a check-in instruction for the controller 102 (S61), and instructs the controller 102 to do check-in (S62). This check-in instruction includes the vehicle ID. Upon receiving the check-in instruction, the controller 102 stores the bicycle in a vacant pallet and stores information on which pallet the bicycle has been stored in in the inventory status storage 104 (see FIG. 5) (S63).

When the bicycle is successfully checked in, the cooperative control unit 124 transmits notification of the completion of check-in to the sharing server 200 (S64). The notification of the completion of check-in includes the vehicle ID. Upon receiving the notification of the completion of check-in (S65), the sharing server 200 keeps track of the checked-in bicycle (S66). In other words, the sharing server 200 keeps track of the status indicating that the bicycle has been returned.

The bicycle parking system 100 of the second embodiment has the same advantage of being able to cooperate with sharing operators as the first embodiment. In addition, since the second embodiment has the configuration in which the cooperative control unit 124 installed in the bicycle parking system 100 locally does check-in and check-out and transmits the result to the sharing server 200, the bicycle parking system 100 of the second embodiment can reduce time for check-in and check-out.

Upon receiving the request to check out a bicycle, the cooperative control unit 124 chooses a bicycle of the sharing operator stored in the bicycle parking system 100, converts the check-out instruction as to the chosen bicycle, and instructs the controller 102 to do check-out. So, cooperation with a plurality of different sharing servers 200 can be realized without changing the specifications of the controller 102.

Third Embodiment

The bicycle parking system 100 of a third embodiment will be described below. The configuration of the bicycle parking system 100 of the third embodiment is basically the same as the bicycle parking system 100 of the first embodiment. When a sharing operator's bicycle is checked in the bicycle parking system 100 of the first embodiment, the inventory status storage 104 of the bicycle parking system 100 is used to keep track of the vehicle ID given by the sharing operator. On the other hand, the bicycle parking system 100 of the third embodiment is configured not to keep track of vehicle IDs of the sharing operators' bicycles.

FIG. 11 shows an example of data stored in the inventory status storage 104 of the third embodiment. As seen in records with pallet numbers P004 and P023, the fact that the bicycles belong to a sharing operator Y is kept track of as to the bicycles of the sharing operator Y, and the inventory status storage 104 does not have data that identifies vehicles. The same goes for a record with a pallet number P025 where a sharing operator X's bicycle is stored.

Figure 12:
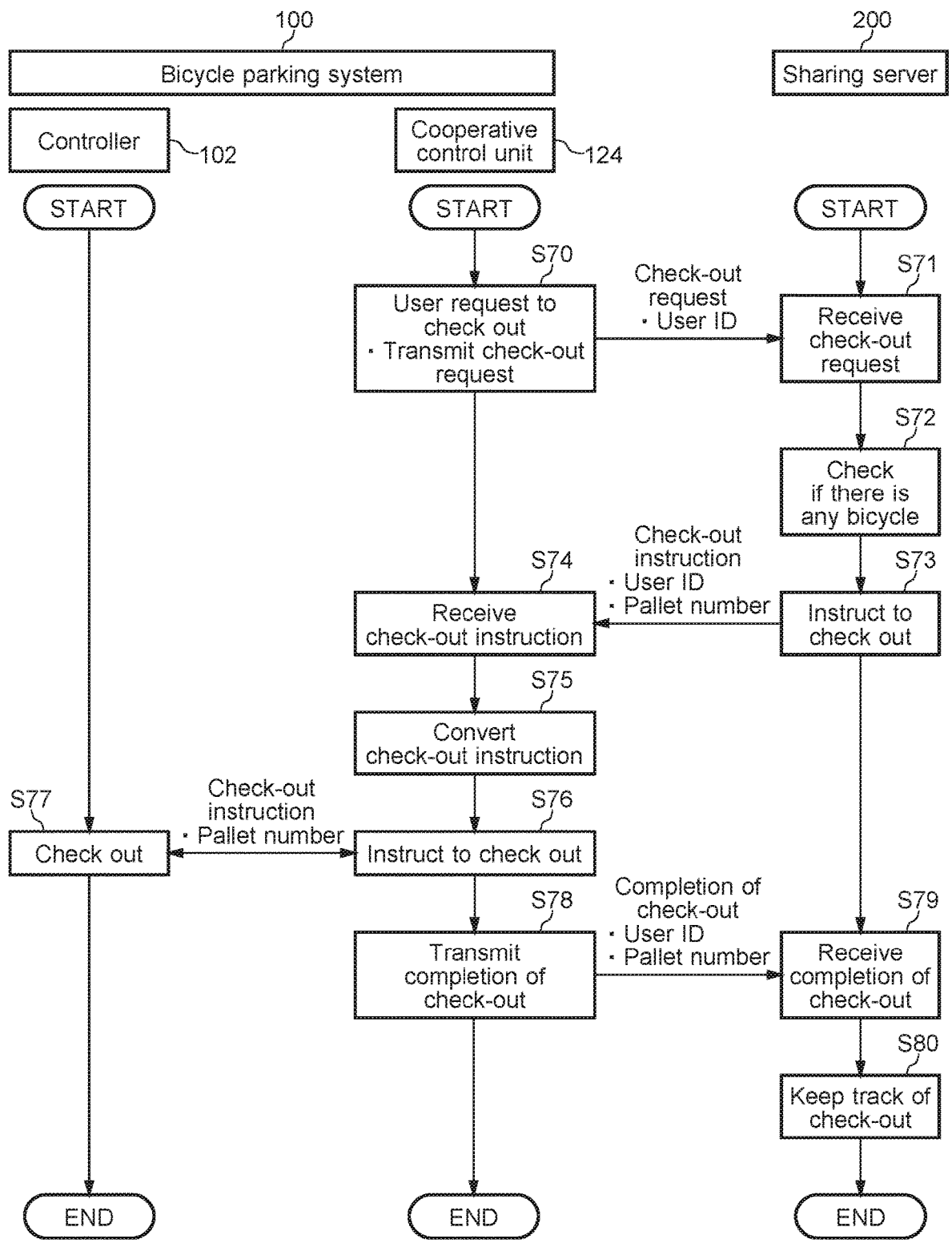
FIG. 12 shows an operation example of checking out a sharing operator's bicycle by means of the bicycle parking system of the third embodiment.

FIG. 12 shows an operation example of checking out a sharing operator's bicycle by means of the bicycle parking system 100 of the third embodiment. When a user operates through the touch panel 53 to request to check out a bicycle, the cooperative control unit 124 transmits a check-out request to the sharing server 200 (S70). The check-out request transmitted from the cooperative control unit 124 to the sharing server 200 includes the user ID.

Upon receiving the check-out request (S71), the sharing server 200 checks whether any bicycle is left in the bicycle parking facility from which the request came or not based on data managed in the sharing server 200 (S72). When there is a bicycle, the sharing server 200 of the third embodiment also has control of the number of the pallet where the bicycle is stored. If a bicycle is left in the bicycle parking facility, the sharing server 200 transmits an instruction to check out the bicycle to the bicycle parking system 100 (S73). This check-out instruction shall include the user ID and the number of the pallet where the bicycle to be checked out is stored. When there are a plurality of bicycles left in the bicycle parking facility, the sharing server 200 chooses which bicycle to check out.

Upon receiving the check-out instruction transmitted from the sharing server 200 (S74), the cooperative control unit 124 of the bicycle parking system 100 converts the check-out instruction to a check-out instruction for the controller 102 (S75), and instructs the controller 102 to do check-out (S76). This check-out instruction includes the pallet number. Upon receiving the check-out instruction, the controller 102 checks out the bicycle stored in the pallet with the pallet number included in the check-out instruction (S77).

When the bicycle is successfully checked out, the cooperative control unit 124 transmits notification of the completion of check-out to the sharing server 200 (S78). The notification of the completion of check-out includes the user ID and the pallet number of the pallet where the checked-out bicycle has been stored. Upon receiving the notification of the completion of check-out (S79), the sharing server 200 keeps track of the checked-out bicycle (S80). In other words, the sharing server 200 keeps track of which user is using which bicycle.

Figure 13:
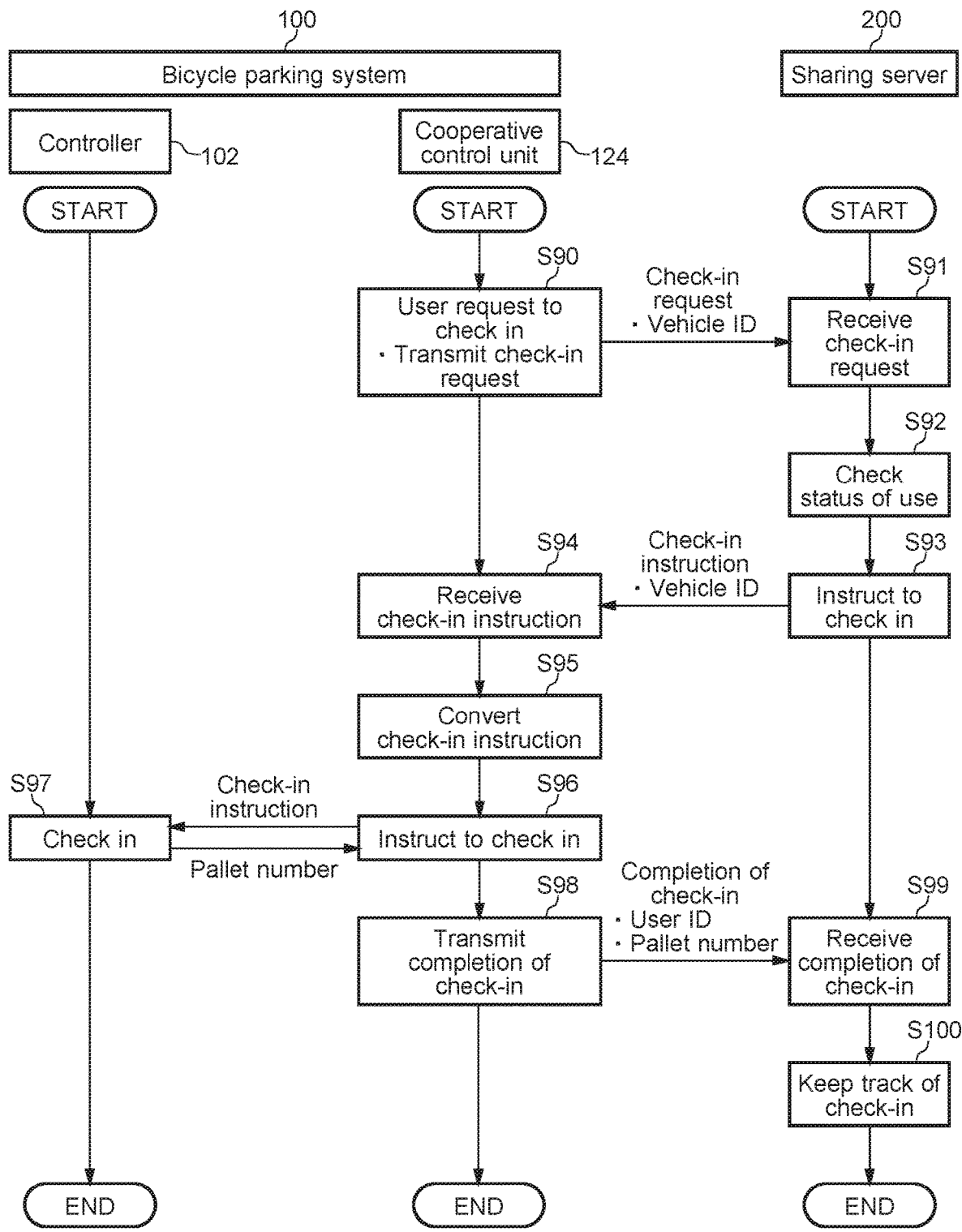
FIG. 13 shows an operation example of checking in a sharing operator's bicycle by means of the bicycle parking system of the third embodiment.

FIG. 13 shows an operation example of checking in a sharing operator's bicycle by means of the bicycle parking system 100 of the third embodiment. When a user operates through the touch panel 53 to request to check in a bicycle, the cooperative control unit 124 transmits a check-in request to the sharing server 200 (S90). The check-in request transmitted from the cooperative control unit 124 to the sharing server 200 includes the vehicle ID.

Upon receiving the check-in request (S91), the sharing server 200 checks the status of use of the bicycle based on data managed in the sharing server 200 (S92). The status of use is, for example, which user is currently using the bicycle related to the vehicle ID included in the check-in request. If it is consequently confirmed that the bicycle related to the vehicle ID is currently in use, the sharing server 200 transmits a check-in instruction to the bicycle parking system 100 (S93). This check-in instruction shall include the vehicle ID of the bicycle to be checked in.

Upon receiving the check-in instruction transmitted from the sharing server 200 (S94), the cooperative control unit 124 of the bicycle parking system 100 converts the check-in instruction to a check-in instruction for the controller 102 (S95), and instructs the controller 102 to do check-in (S96). Upon receiving the check-in instruction, the controller 102 stores the bicycle in a vacant pallet and stores information on which pallet the bicycle has been stored in in the inventory status storage 104 (see FIG. 5) (S97). The controller 102 also notifies the cooperative control unit 124 of the number of the pallet where the bicycle has been stored.

When the bicycle is successfully checked in, the cooperative control unit 124 transmits notification of the completion of check-in to the sharing server 200 (S98). The notification of the completion of check-in includes user ID and the number of the pallet. Upon receiving the notification of the completion of check-in (S99), the sharing server 200 keeps track of the checked-in bicycle (S100). In other words, the sharing server 200 keeps track of the status indicating that the bicycle has been returned.

The bicycle parking system 100 of the third embodiment has the same advantage of being able to cooperate with sharing operators as the first embodiment. In addition, since the inventory status storage 104 of the bicycle parking system 100 of the third embodiment does not keep track of the vehicle IDs given by the sharing operators as to pallets storing the sharing operators' bicycles, the original bicycle parking system 100 requires less change in specifications. Since the cooperative control unit 124 converts check-in and check-out instructions transmitted from the sharing server 200 to commands processable for the controller 102, cooperation with a plurality of different sharing servers 200 can be realized without changing the specifications of the controller 102.

While data indicating which sharing operator owns a bicycle stored in a pallet is stored in the embodiment, there may be a configuration where just a flag indicating that a pallet is in use is set and which sharing operator's bicycle is stored is not kept track of.

While the bicycle parking system of the invention has been described in detail above with embodiments, the invention is not limited to the above-described embodiments.

Figure 14:
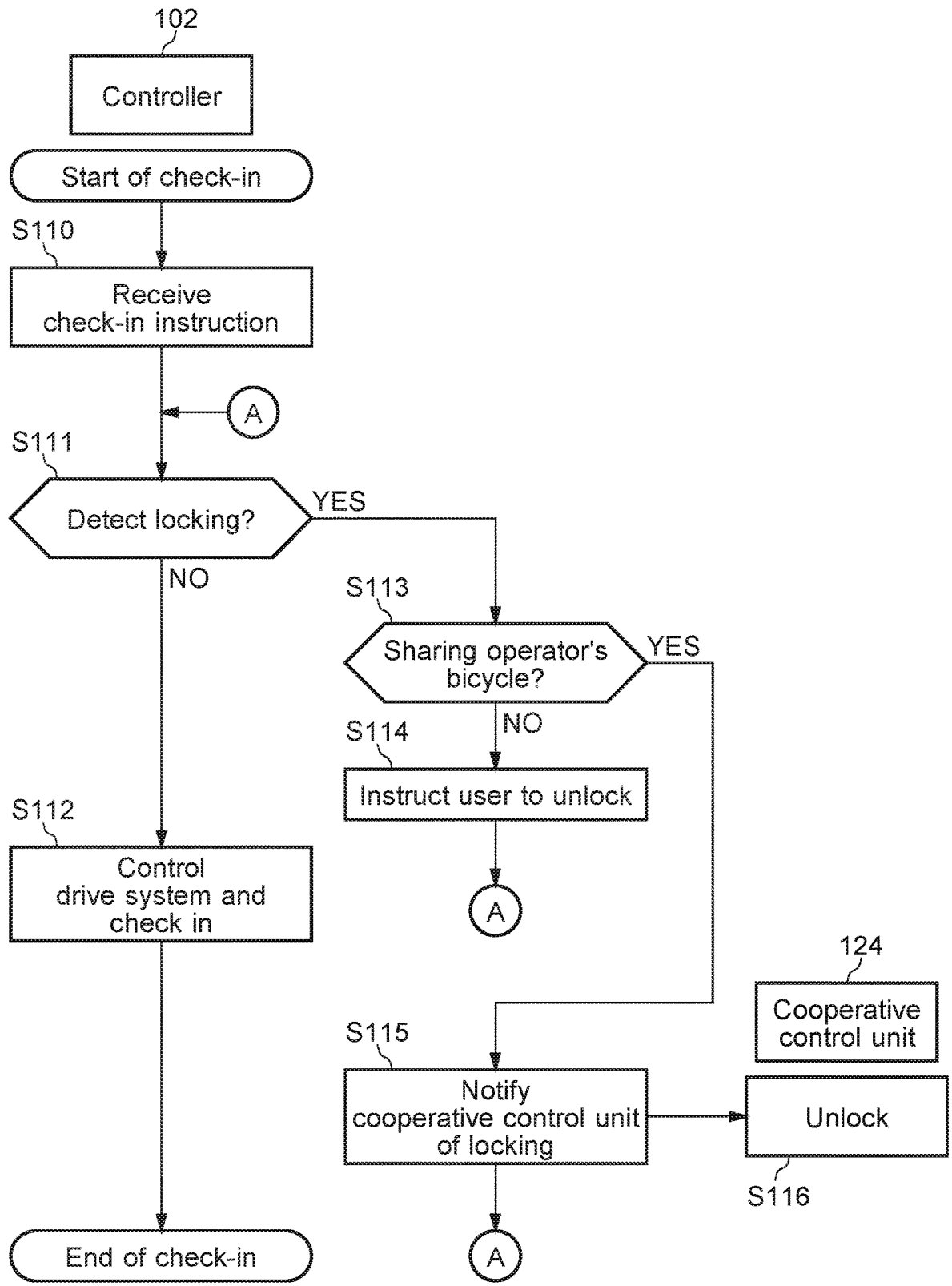

The bicycle parking system 100 of the embodiments may do a process to unlock a sharing operator's bicycle when it is detected to be locked at check-in. FIG. 14 illustrates in detail a process to be performed when locking is detected at check-in. Various types of detection for safety, which are not shown, are performed at check-in in addition to the locking detection, but those other than the locking detection are omitted in FIG. 14.

Upon receiving a check-in instruction from the cooperative control unit 124 or start switch 501 (S110), the controller 102 starts a check-in operation and then determines whether the bicycle is detected to be locked or not (S111). If locking is not detected (NO at S111), the controller 102 controls the drive system 110 to do the check-in operation (S112). If locking is detected (YES at S111), the controller 102 determines whether the bicycle to be checked in is a sharing operator's bicycle or not (S113).

If the bicycle at check-in is not a sharing operator's bicycle (NO at S113), the controller 102 instructs the user to unlock (S114). If the bicycle is a sharing operator's bicycle (YES at S113), the controller 102 notifies the cooperative control unit 124 of the locking (S115). Responding to this, the cooperative control unit 124 unlocks the bicycle (S116). An interface (e.g. Bluetooth (registered trademark), etc.) for communicating with smart locks of bicycles is provided in the operator-specific unit 120 in order for the cooperative control unit 124 to unlock bicycles. The cooperative control unit 124 unlocks shared bicycles using the interface integrated in the operator-specific unit 120 in this manner, and therefore the controller 102 has only to notify the cooperative control unit 124 of the locking and does not have to support each operator's specifications.

Locking a bicycle when returning it to a cycle port is common in bicycle sharing systems, and therefore those bicycle sharing systems cannot cooperate with automated bicycle parking facilities it users of those systems similarly try to check in with their bicycles locked. As shown in this example, bicycle sharing systems can cooperate with automated bicycle parking facilities by allowing users to return sharing operators' bicycles unlocked.

While the example has been described in which the cooperative control unit 124 unlocks a sharing operator's bicycle when it is detected to be locked, users may be instructed to unlock also when those bicycles belong to sharing operators. Sharing operators' bicycles are usually locked when they are returned, and therefore it is to be desired to output a message saying that bicycles can be returned unlocked. Some sharing operators' bicycles have a function to communicate with their sharing servers 200. In such case, the cooperative control unit 124 may notify the sharing server 200 of the detection of locking, and the sharing server 200 may unlock the smart lock of the bicycle.

The controller 102 of the bicycle parking system 100 may transmit data indicating the number of vacant pallets through the cooperative control unit 124 to the sharing server 200. This allows the sharing server 200 to determine whether an automated bicycle parking facility can be used as a place to return their bicycles or not and notify the users using their bicycles of the determination.

Figure 15:
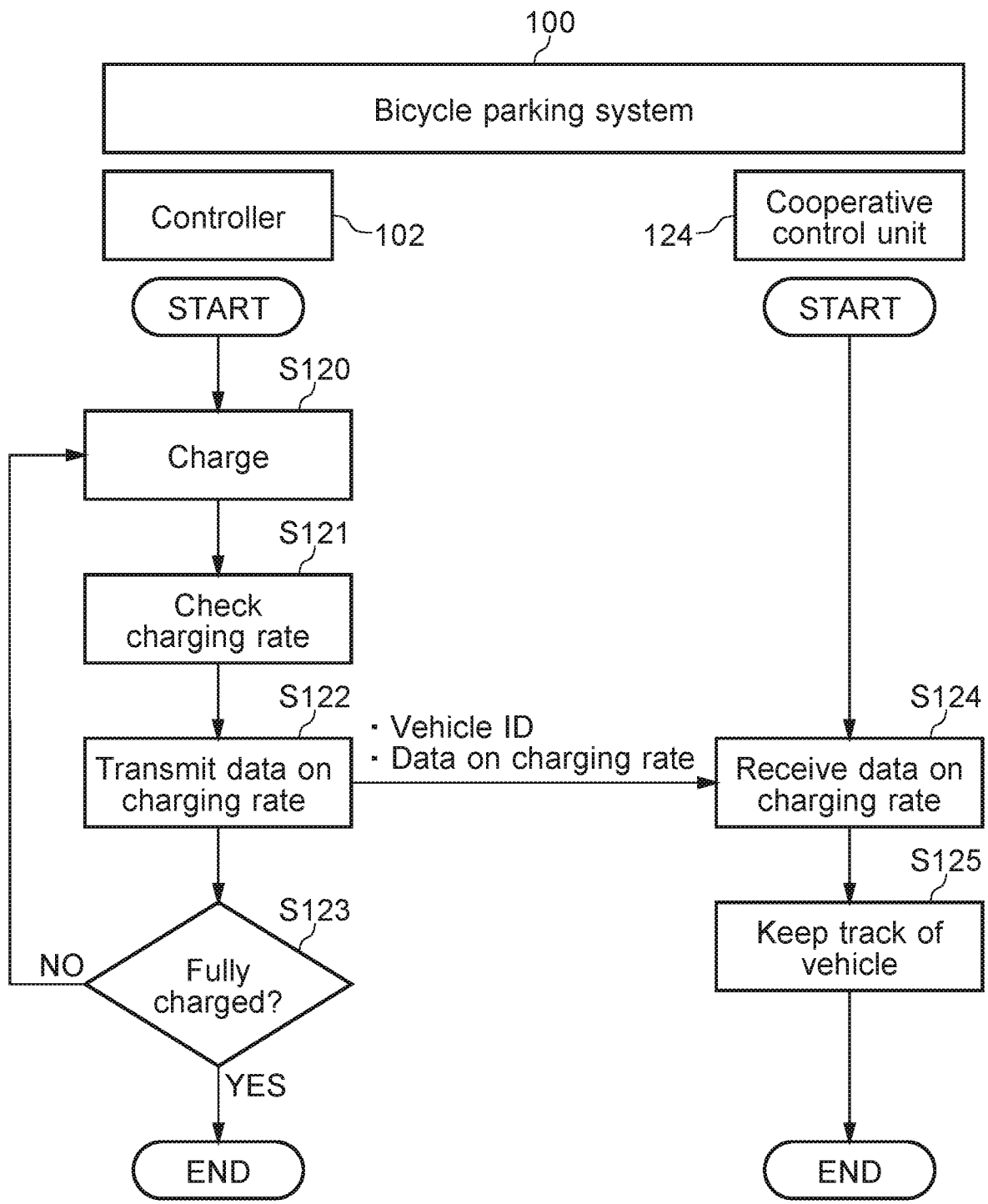
FIG. 15 shows an operation of a bicycle parking system capable of charging an electric bicycle.

If electric bicycles can be charged in the bicycle parking system 100, data indicating the charging rate may be provided to the cooperative control unit 124. FIG. 15 shows an operation of the bicycle parking system 100 capable of charging an electric bicycle. The controller 102 uses a charger to charge a checked-in shared bicycle (S120). The controller 102 checks the charging rate on a regular basis (S121), and transmits the vehicle ID of the bicycle being charged and data indicating the charging rate to the cooperative control unit 124 (S122). Upon receiving the data indicating the charging rate (S124), the cooperative control unit 124 stores the received data in association with the vehicle ID (S125). The controller 102 determines whether the bicycle is fully charged or not (S123), and keeps charging it until full charge.

Storing data indicating the charging rate of electric bicycles in association with the vehicle IDs in this manner allows for choosing a bicycle with a high charging rate when an electric bicycle is to be checked out. If data indicating the charging rate is transmitted to the sharing server 200 and the sharing server 200 keeps track of the charging rate of the electric bicycles, users can be informed of which bicycle parking facility has a charged electric bicycle. The transmission of data on the charging rate to the sharing server 200 may be performed on a regular basis or when the sharing server 200 queries. Some sharing operators' bicycles have a function to communicate with their sharing servers 200. In such case, the charging rate may be transmitted from a shared bicycle through the sharing server 200 to the cooperative control unit 124, which may notify the controller 102, which may thus inform the user.

While the above embodiments have been described with the example in which the touch panel 53 is provided as an operation unit for a user of a sharing operator to do check-in and check-out at a bicycle parking facility, instructions for check-in, check-out, and the like can be given by using a user's smartphone or other mobile terminal. In such case, a sharing operator application is installed on a mobile terminal, and instructions to check a bicycle in and out are accepted on the application. When instructions for check-in and check-out are inputted through a user's operation, the mobile terminal transmits the inputted check-in and check-out instructions to the cooperative control unit 124. Upon receiving the check-in and check-out instructions through the communications unit 122, the cooperative control unit 124 gives the check-in and check-out instructions to the controller 102. In this mode, the mobile terminal and the communications unit 122 comprise the instruction input unit.

As mentioned in the beginning, the parking system of the invention can also be applied to gate-type and separate-lock-type bicycle parking facilities. The configuration for cooperating with sharing servers, when applied to these types of bicycle parking facilities, is also basically the same as the configuration for the automated bicycle parking facilities described in the embodiments. In other words, in a case where the parking system of the invention is applied to a gate-type bicycle parking facility, a gate device provided at the doorway of the bicycle parking facility corresponds to the control system for controlling check-in and check-out. In a case where the parking system of the invention is applied to a separate-lock-type bicycle parking system, a payment machine connected with separate locks to open and close the locks corresponds to the control system. When a sharing operator's bicycle has come, a gate device or a payment machine communicates with the sharing server and, upon receiving instructions for check-in and check-out from the sharing server, opens and closes the gate device. The parking system of the invention can also be applied to gate-type or flap-type parking facilities and, in this case, a gate device or a payment machine corresponds to the control system and cooperates with car-sharing operators.

INDUSTRIAL APPLICABILITY

The invention is useful as a parking system capable of cooperating with sharing operators.

This application claims the priority of Japanese Patent Application No. 2018-114189 filed on Jun. 15, 2018, the entire disclosure of which is incorporated herein.

The invention claimed is:

1. A parking system comprising:
   an inventory status storage storing the status of inventory of a vehicle, wherein the vehicle is a bicycle, two-wheeled vehicle or car;
   a control system that controls the status of inventory of the vehicle and controls check-in and check-out of the vehicle based on data stored in the inventory status storage; and
   a plurality of cooperative control units that corresponds to servers of external rental operators, respectively, wherein
   each of the plurality of cooperative control units:
      receives, from the server of one of the external rental operators, instruction data on check-in and check-out, wherein the instruction data is incompatible with the control system and differs in each of the servers of the external rental operators;
      converts the instruction data to command data compatible with contol system; and
      sends, to the control system, the commmand data that causes the control system to perform the check-in and check-out.

2. The parking system according to claim 1, wherein
   the external rental operators are capable of cooperating with a parking facility for the vehicle, and
   each of the cooperative control units follows a procedure prescribed for each of the rental external opertors to instruct the control system to perform the check-in and check-out.

3. The parking system according to claim 1,
   wherein the parking system is an automated bicycle parking facility for storing an unlocked bicycle, and
   wherein the cooperative control unit notifies the server of the external rental operator of the completion of check-in even when a bicycle of the external rental operator is checked in the bicycle being unlocked.

4. The parking system according to claim 1, further comprising an instruction input unit for receiving instructions for check-in and check-out from a user,
   wherein the cooperative control unit:
      transmits check-in and check-out requests to the server of the external rental operator when instructions for check-in and check-out are inputted through the instruction input unit;
      receives from the server of the external rental operator, a vehicle identifier of the vehicle to be checked in and out; and
      instructs the control system to perform the check-in and check-out with the vehicle identifier.

5. The parking system according to claim 1, comprising an instruction input unit for receiving instructions for check-in and check-out from a user,
   wherein, after the vehicle is checked in and out according to check-in and check-out instructions inputted through the instruction input unit, the cooperative control unit transmits a vehicle identifier of the vehicle checked in and out and notification of the completion of check-in and check-out to the server of the external rental operator.

6. The parking system according to claim 1, further comprising:
   a locking detector that detects that the vehicle to be checked in has been locked; and
   a notifier that sends, upon detecting that the vehicle has been locked, a message for causing the vehicle to be unlocked.

* * * * *

UNITED STATES PATENT AND TRADEMARK OFFICE
CERTIFICATE OF CORRECTION

| | | |
|---|---|---|
| PATENT NO. | : 11,434,652 B2 | |
| APPLICATION NO. | : 17/252464 | |
| DATED | : September 6, 2022 | |
| INVENTOR(S) | : Toshio Ikeda et al. | |

It is certified that error appears in the above-identified patent and that said Letters Patent is hereby corrected as shown below:

In the Claims

Column 14, Claim 2, Line 5, the word "opertors" should read --operators--,

Column 14, Claim 3, Line 14, the word "with" has been omitted. Line 14 should read --is checked in with the bicycle being unlocked--, Column 14, Claim 4, Lines 21 and 22, the word "the" has been omitted. Lines 21 and 22 should read --of the external rental operator when instructions for the check-in and check-out are inputted through the--.

Signed and Sealed this
Twenty-third Day of May, 2023

Katherine Kelly Vidal
*Director of the United States Patent and Trademark Office*